United States Patent [19]

Zwick

[11] Patent Number: 4,885,092
[45] Date of Patent: Dec. 5, 1989

[54] PROCESS FOR THE MANUFACTURE OF ASYMMETRIC, POROUS MEMBRANES AND PRODUCT THEREOF

[75] Inventor: Maurice M. Zwick, Stamford, Conn.

[73] Assignee: American Cyanamid, Stamford, Conn.

[21] Appl. No.: 310,995

[22] Filed: Feb. 17, 1989

Related U.S. Application Data

[62] Division of Ser. No. 842,740, Mar. 24, 1986, Pat. No. 4,865,785.

[51] Int. Cl.⁴ .............................................. B01D 13/00
[52] U.S. Cl. ........................... 210/500.41; 210/500.43
[58] Field of Search ................ 264/209.1, 182, 41; 210/651, 500.34, 500.42, 500.41, 500.43

[56] References Cited

U.S. PATENT DOCUMENTS

| | | | |
|---|---|---|---|
| 3,615,024 | 10/1971 | Michaels | 210/500.42 X |
| 4,409,162 | 10/1983 | Takao | 264/209.1 X |
| 4,545,910 | 10/1985 | Marze | 210/651 |
| 4,629,563 | 12/1986 | Wrasidlo | 210/500.34 |

Primary Examiner—Frank Spear
Attorney, Agent, or Firm—Frank M. Van Riet

[57] ABSTRACT

A process for the production of asymmetric, porous membranes is disclosed which comprises extruding liquified polymer in tubular form and while expanding said film during processing, subjecting it to conditions such that the inside and outside surfaces of the film receive distinct treatments.

5 Claims, 3 Drawing Sheets

PROCESS FOR THE MANUFACTURE OF ASYMMETRIC, POROUS MEMBRANES AND PRODUCT THEREOF

BACKGROUND OF THE INVENTION

A semipermeable membrane widely in industrial use involving applications including reverse osmosis, gas separation, and ultrafiltration is one prepared from cellulose acetate by a casting process. Although such a membrane is very highly permeable to water but not to sodium chloride, it deteriorates in performance due to the inherent susceptibility of cellulose acetate to hydrolysis. As a result, the ability to remove solutes such as sodium chloride decreases with time and the life of the membrane is therefore limited. Due to these hydrolytic tendencies, cellulose acetate membranes can only be considered for specific uses wherein conditions leading to hydrolysis are not present. Polymers that are chemically more stable have, therefore, begun to replace cellulose acetate as membrane materials.

Basic considerations with respect to semipermeable membranes useful for ultrafiltration, reverse osmosis, gas separation and the like are that they generally exist in one of two forms: (1) dense, essentially non-porous films and (2) porous, asymmetric films. A dense polymer film in many cases can be given uniaxial or biaxial orientation which increases its mechanical strength and its selectivity as a membrane. Unfortunately, such films, as a rule, offer too much resistance to the flow of desirable permeates and have in most applications been replaced by solvent-cast porous membranes. The latter are specifically made to have a very thin, dense 'active' surface supported by a porous substructure. In many cases there exists a gradation of pore sizes throughout the thickness of the porous substructure with the smaller pores being closer to the dense 'active' surface. It is the 'active' dense surface which rejects some solute components and allows passage of others. This selectivity does not depend on the thickness of the active surface as long as the latter has no pinholes or cracks. The porous substructure constitutes the mechanical support for the thin active surface and should offer as little resistance to the flux of the desirable permeates as possible. This is best achieved when the pores are open and interconnecting and, preferably, longitudinal in shape perpendicular to the active surface of the membrane. Such membranes are obtained by careful solvent casting processes known in the art and described, for example, in U.S. Pat. Nos. 3,133,132; 3,133,137; 3,170,867; 3,567,810; 3,615,024 and 3,884,801.

The prior art methods of preparing such membranes are complicated, slow and require the use of difficult operating conditions. As a result, such procedures are restricted to a limited number of polymers. This restriction arises from the fact that it is difficult to select the casting solvent, additives, temperature of the casting solution and conditions of the environment that will yield membranes in continuous processes and at industrially practical output rates. Even at linear production speeds of only one meter per minute, the flux and porosity of membranes are difficult to control in conventional processes and mechanical properties, due to the lack of provision for molecular orientation, are not optimized.

It is the nature of any solvent casting process that the resultant dense active skin surface of the cast membrane is isotropic. This is true whether the casting process is carried out in one step to simultaneously provide the thin skin and the porous substructure or in two steps wherein a thin skin is applied to a prefabricated porous substructure. There is little opportunity to conduct mono- or biaxial stretching of cast film during the slow, complex solvent casting process steps while maintaining the integrity of the assymetric membrane film structure which is of primary importance.

Previous attempts have been made to provide semipermeable membranes of the polyacrylonitrile and other type polymers which are superior to cellulose acetate in chemical, mechanical, and thermal properties as well as in water permeability. Such attempts were intended to simultaneously provide a membrane with a skin layer and a supporting layer, employing a casting process. Often the membranes obtained did not exhibit satisfactory performance because proper casting conditions were difficult to maintain under industrial operating conditions. It is generally recognized that formation of a membrane having a satisfactory skin layer with such polymer types is a tedious and delicate process when using casting procedures.

A recent patent, U.S. Pat. No. 4,364,759, attempts to solve some of the problems connected with the casting of porous membranes by producing a hollow fiber precursor and coagulating the precursor. The resultant membranes however, because they are not biaxially oriented, do not have the bursting strength and separation selectivity required for many service applications wherein strength and selectivity is a prerequisite.

What is desirable, therefore, is a process for the preparation of porous asymmetric film membranes, which process is not only more expeditious to conduct than a solvent casting process but also can directly provide a molecularly oriented dense active skin surface on top of a supporting porous substrate. The provision for such a process and the resulting product would fulfill a long-felt need and constitute a significant advance in the art.

THE DRAWINGS

Figure 1:
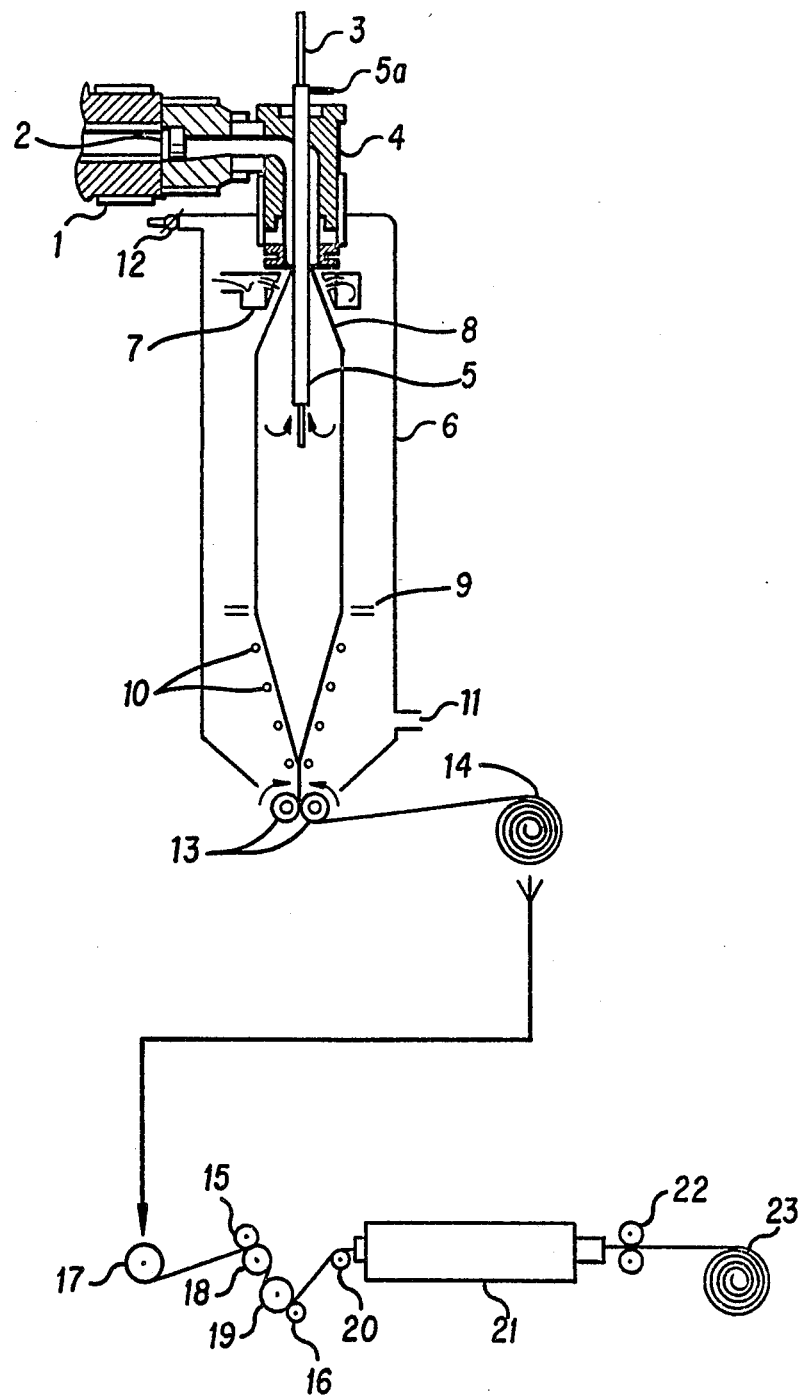
FIG. 1 represents a schematic drawing of suitable equipment for conducting an embodiment of the invention whereby the membrane is produced within a controlled atmosphere.

By the terms "vaporous conditions" and/or "vapor treatment" etc., as used herein, is meant the use of a mechanism for creating porosity in one surface of the membranes herein, said mechanism comprising a gas, vapor, mist, aerosol or the like.

SUMMARY OF THE INVENTION

This invention relates to an improved process for the preparation of porous asymmetric film membranes useful in ultrafiltration processes. More particularly, this invention relates to such a process wherein a polymer, liquified by means of at least one of a polymer solvent and a non-solvent melt-assistant, is extruded through an annular die to form a tubular film which is expanded and stretched to provide biaxial orientation while simultaneously being subjected to conditions such that each of the two surfaces of the tubular film, i.e. inner and outer surfaces, receives a different treatment, and subsequently slitting the tube to provide a porous film membrane having a dense, biaxially oriented surface.

DESCRIPTION OF THE INVENTION INCLUDING PREFERRED EMBODIMENTS

In accordance with the present invention, there is provided a process for preparing a porous, asymmetric membrane which comprises extruding a liquified, film-forming polymer through an annular die to form a tubular film having an internal surface (A) and an external surface (B), said liquified polymer being obtained by use of a polymer solvent, alone or in conjunction with one or more melt assistants; orienting said film while exposing said film, preferably while in tubular form and during biaxial orientation, to vaporous conditions such that said two surfaces (A) and (B) each receive vapor treatments which differ from one another in at least one condition of temperature, and/or chemical composition to provide a membrane having one dense, biaxially oriented surface and a second less dense surface; and optionally, slitting said tubular membrane to provide a planar membrane having one surface more dense than the other surface.

The process of the present invention provides a membrane having two surfaces, one of which is a dense, biaxially oriented skin surface and the other of which is generally a more porous surface. While both surfaces may be shown to have biaxial orientation, generally one surface will be substantially more dense and biaxially oriented than the other, the less dense surface being suitably porous such as to enable a high rate of flux through the membrane. The fact that the present invention provides a dense surface with high flux while at the same time providing biaxial orientation is highly significant in view of the art wherein no specific provision is made for the one-step production of such a membrane. The present invention is also unique in exposing the two surfaces of a tubular film simultaneously to different vaporous conditions, preferably while biaxially orienting the film.

The process of the present invention, in preferred embodiments, operates advantageously using polymer in liquified form at a solids content in the range of up to about 70-80% while providing membranes of satisfactory pore structure and biaxial orientation. This result is surprising in view of the prior art use of low polymer solids levels, i.e. 10-20%, in flat membrane casting procedures, and 25-50% in hollow fiber extrusion.

In accordance with the present invention, there is provided a porous, asymmetric polymer membrane having two surfaces one of which is denser than the other, the denser surface exhibiting a biaxial orientation angle in the plane of the denser surface of less than about 70°, said membrane exhibiting a porosity gradient across its thickness with void spaces generally decreasing in at least one of size and number in the direction of the denser surface, the density of said denser surface being such that the permeability/impermeability characteristics enable desirable separations to be achieved in an ultrafiltration process. The latitudinal orientation is achieved by the introduction of vapor into the interior of the extruded tubular film under pressure such that the ratio of the inside diameter of the tubular film to the inside orifice diameter of the annulus is usually about 3.0 or more. The longitudinal orientation of the film is achieved by the stretch provided by the roll seal at the foot of the tube below the flattening guides. It is preferred that the longitudinal and latitudinal stretch (orientation) be equivalent, however variations of one from the other up to about 25% are tolerable.

The porous, asymmetric membrane formed according to the present invention possesses a high degree of biaxial orientation as indicated by orientation angles generally in the range of about 60°-70°, the membrane being produced by the process of the invention, as described above. Asymmetric membranes of such a high degree of biaxial surface orientation were previously unknown since they cannot be obtained in processes wherein extension of the nascent membrane is not provided. This biaxial orientation is in the plane of both surfaces and is readily measured by the method described in U.S. Pat. No. 3,275,612. In addition, the membrane shows a porosity within its thickness with void space generally increasing in the direction away from the dense surface. The density of the skin surface of the membrane of the present invention is such as to provide permeability/impermeability characteristics that produce desirable separations in ultrafiltration processes and, accordingly, the actual densities obtained may vary widely. However, by proper control of processing, it is possible to provide membranes of the desired porosity for specific uses. In a specific case, such as reverse osmosis, for example, the density of the skin surface is such as to allow water to permeate but to essentially prevent permeation of specific salts, such as sodium chloride. The porosity gradient is observed microscopically by examining cross-sections through the thickness of the membrane and permeability may be determined by suitable known methods.

The invention is more fully illustrated in the following description with particular reference to the accompanying drawings in which:

FIG. 1 represents a schematic view of an embodiment of the present invention employing a solidification zone pressurized with, for example, a vapor on one side of a tubular film and circulating air and vapor on the other side of the film.

Figure 2:
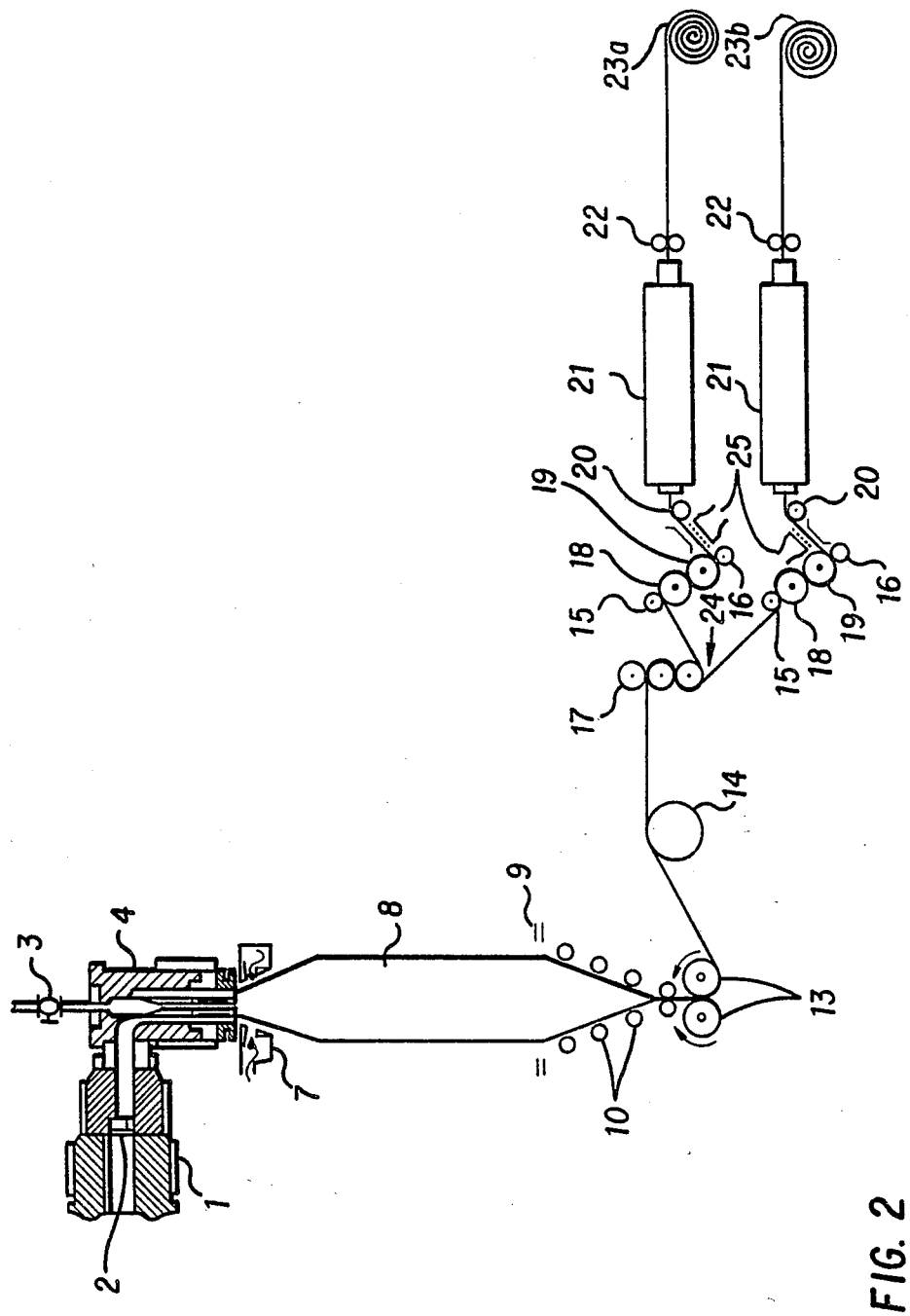
FIG. 2 represents a similar schematic diagram of suitable equipment for conducting an embodiment of the present invention wherein the membrane is produced in an ambient environment and wherein the web is slit into two separate membranes.

FIG. 2 represents a schematic view of an embodiment of the process of the present invention employing no encasing in the solidification zone, e.g. with stagnant air within a tubular film.

Figure 3:
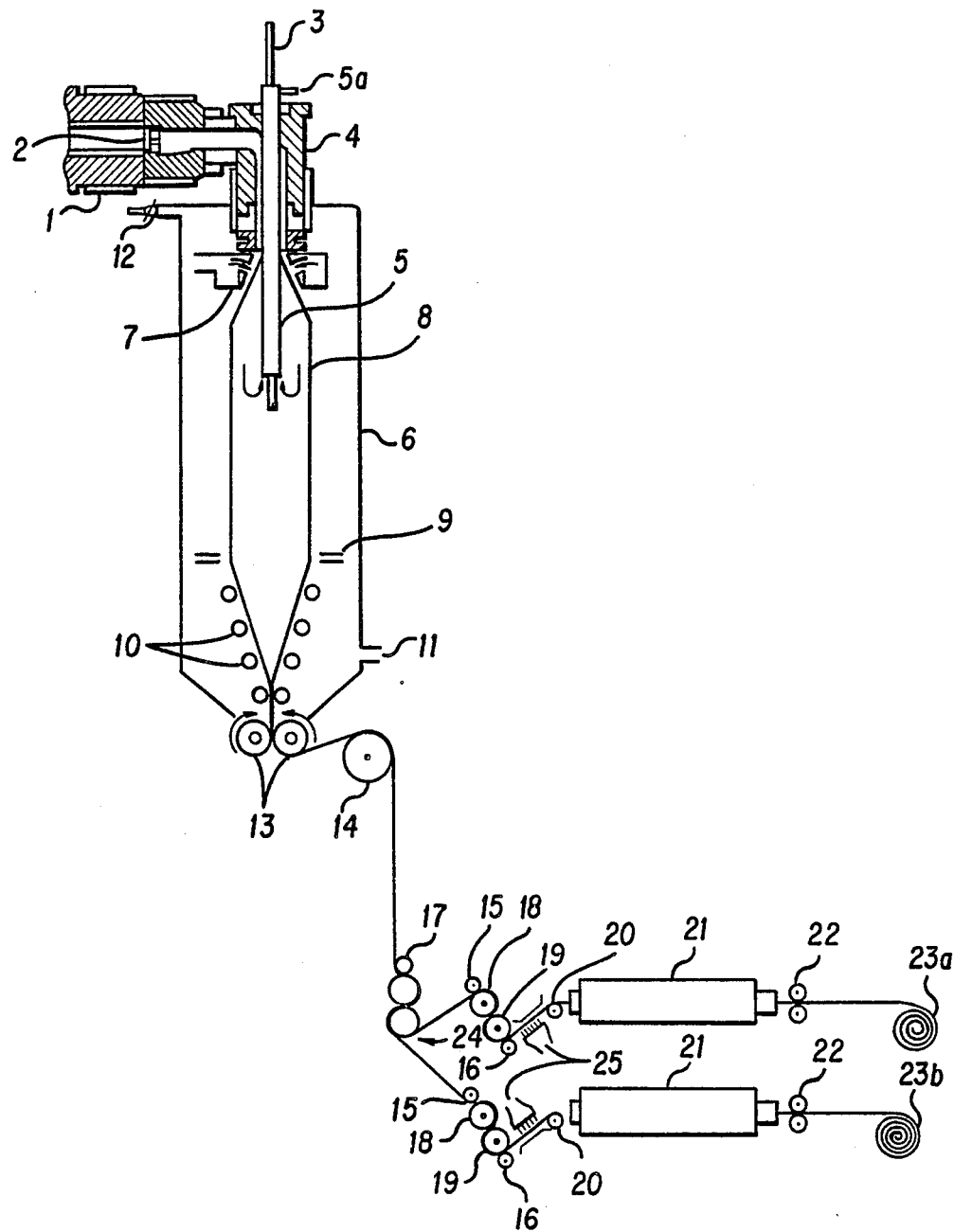
FIG. 3 represents a schematic diagram similar to that of FIG. 1 where the web is again slit into two separate membranes.

FIG. 3 represents a schematic view of another preferred embodiment of the process of the present invention employing, for example, air and a solvent vapor in the solidification zone on one side of a tubular film and saturated steam on the other side.

In carrying out processing in accordance with the present invention, a liquified, film-forming polymer is employed, the liquified polymer being obtained by use of a polymer solvent alone or in conjunction with one or more melt assistants. A polymer solvent, of course, when used in proper proportions and under proper conditions will completely dissolve the polymer and provide a liquified composition capable of extrusion at ordinary pressures. Melt-assistants are compositions which are either non-solvents for the polymer or are polymer solvents used in proportions inadequate to dissolve the polymer under normal conditions of temperature and pressure. As indicated, melt-assistants and polymer solvents may be used, in accordance with the present invention, in combination, if desired.

There are several procedures by which liquified polymers may be obtained for use in accordance with the present invention. One procedure is simply to dissolve the polymer at adequate temperature in proper proportions of suitable polymer solvent selected from the type which undergo phase separation during processing of the solution in film forming. Such solvents are described in Applied Polymer Symposia 6, 109 (1967), hereby incorporated herein by reference.

Another procedure is to provide a polymer melt using a suitable combination of solvent and melt-assistant at elevated temperatures and pressure. It is generally desirable to employ a polymer solvent as plasticizer and melt-assistant in conjunction with processing since such use generally results in better pore structure in the film. In this connection, it should be noted, that to provide a melt, the proportion of polymer solvent, or polymer solvent-melt assistant mixture employed, should be insufficient to molecularly dissolve the polymer. Useful polymer solvents generally include organic substances which are in liquid form in use, e.g. dimethyl formamide; propylene carbonate; salt solutions; acid solution and mixtures. Non-solvents for the polymer may also be used in appropriate instances as melt-assistants in conjunction with the polymer solvents. Non-solvents may include water, low boiling alcohols, and other organic liquids, preferably miscible with the polymer solvent or mixtures thereof.

Suitable polymers, including polymer blends thereof, include polysulfones, e.g. those having the formula:

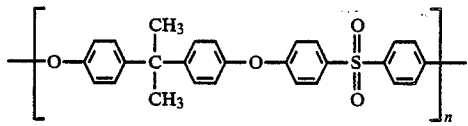

wherein n is 20-100, polyimides, polyamides, polycarbonates, polyesters, cellulose derivatives such as methyl cellulose, ethyl cellulose, cellulose acetate, and the like, as well as vinyl polymers and co-polymers, such as acrylonitrile polymers and copolymers, poly(vinyl alcohol), poly(vinyl pyrrolidone), polyolefins and the like.

The liquified polymer composition may also contain various additives such as liquid and/or solid filler components as a separate disperse phase; lubricants; antistatic agents; pigments; reinforcing microfibrils; and the like. Also present may be inert gases such as air and nitrogen as well as reactive gases such as sulfur dioxide, carbon dioxide, ammonia, and the like.

In carrying out processing to provide the tubular film in accordance with the present invention, the procedure followed when a melt-assistant is used with a solvent to obtain the liquified polymer will be an assisted melt spinning process as described in U.S. Pat. No. 4,301,112, issued Nov. 17, 1981 to M. Zwick, and hereby incorporated herein by reference, except for variations as described herein. When a polymer solvent is used alone in proportions which dissolve the polymer at ordinary pressures, the procedure followed will be a phase separation process as described in Applied Polymer Symposia 6, 109, (1967), also hereby incorporated herein by reference, except for variations as described herein.

Referring to FIG. 1, representing a generalized embodiment of the present invention, there is shown apparatus and processing according to the present invention. A spinning head 1 is shown through which liquified polymer is extruded through a filter 2 and a circular die 4 which contains inlet 3 for entry of compressed gas or vapor into the center of the annulus and outlets 5 and 5-A for escape of gas or vapor. The film 8 which forms at the lip of the die is inflated by gas or vapor pressure introduced therein via inlet 3 causing the film to stretch latitudinally. The nascent film is contained within the confines of a solidification zone 6 which is pressurized with vapor or gas entering at 11, the pressure therein being controlled by valve 12. Vapor ring 7 is optional and can supply auxiliary heating to prevent cooling of the nascent film due to evaporation of liquid therefrom. Inside the stretching film is a mixture of the extraneously added gas or vapor and vaporized solvent and other ingredients which issue from the liquified polymer. As the film proceeds downwardly through the solidification zone, the exterior thereof becomes porous due to the effect of the steam in the solidification zone while the interior thereof becomes more dense by action of the vaporous ingredients therein. A membrane is thus created which is then optionally contacted with a quench 9 and conducted by flattening guides 10 to form a flattened tube which passes through roll seal 13 which both seals the bottom of the expanded tube against leakage of internal pressure and serves the function of transmitting longitudinal stretch to the membrane. The membrane exiting the solidification zone is taken up on wind-up roll 14. The membrane may be subjected to other processing as may be desired including the washing out of any solvents or non-solvents which may remain therein. If it is desired to dry the membrane, this may be done in separate processing using guide rolls 17, 18, 19, and 20 in conjunction with nip rolls 15 and 16 to feed the membrane to tenter frame 21 operating under suitable conditions. Tension rolls 22 move the membrane through the tenter frame to final wind-up roll 23 at controlled windup speed. Provision (not shown) is also made to slit the flattened tubular membrane to provide a planar version thereof. This procedure provides simultaneous biaxial stretching to the film, as well as creates the porous, less dense exterior side and the more dense interior side of the membrane.

In the embodiment shown in FIG. 1, the vapor conditions maintained within the solidification zone and those maintained within the inflated film differ in at least one condition of temperature, and/or vapor composition. Specific variations are described in the accompanying examples.

Referring to FIG. 2, representing another specific embodiment of the present invention, the apparatus of FIG. 1 has been modified so that the tubular film is formed in air and inflated on the inside with stagnant air. Thus, outlets 5 and 5 A for air exit are eliminated as is the solidification casing zone 6 and vapor inlet 11. In addition, in this embodiment, drying and slitting of the membrane are shown as part of the continuous process. Membrane exiting the roll seal 13 proceeds to slitter 24 and thence to the guide rolls, nips, tenter frame, tension rolls, and final wind-up rolls. The porosity of the membrane is developed by utilizing hot vapor ports 25 through which hot, craze-promoting, non-solvent vapor impinges upon one side thereof prior to its entry into the tenter frame while the film is being additionally stretched.

Referring to FIG. 3, representing yet another embodiment of the process of the present invention, the apparatus of FIG. 1 is again shown operating as described with respect to FIG. 1 except that the solidification zone is pressurized with air and solvent vapor, the inside of the film is expanded and continuously treated with pressurized steam, and the membrane exiting from roll seal 13 is slit, impinged with hot vapor, dried and wound up as in FIG. 2. In this embodiment, the interior side of the extruded tube becomes the less dense porous side of the final membrane.

In processing to provide the desired membrane as described above, additional treatments may be used to enhance the flux of desirable permeates through the membrane by a variety of pore-enlarging or flux-enhancing treatments in accordance with normal processing or as after-treatments in accordance with prior teachings for example, taught in U.S. Pat. No. 4,268,662 (1981), West German Patent Application No. 3,223,844 (1983), or Japanese Patent Application Nos. 80-147,108 (1980); 83-3, 603 (1983) and 83-766347 (1983). Other treatments which may be utilized include those described in U.S. Pat. Nos. 4,147,745; 4,272,378; and 4,283,359.

Variations in processing conditions to which the inside and outside surfaces of the tubular film are exposed as well as the polymer composition employed will affect the porosity and flux characteristics of the resulting film membrane. Additional modification of these properties can be effected by certain additional processing steps and/or after-treatments. Thus, it is possible to provide the membrane in a wide range of porosity values aimed at maintaining desirable flux values. The density of the denser surface is similarly affected and the permeability/impermeability characteristics can be controlled to provide membranes for specific ultrafiltration processes, including reverse osmosis, gas separation, and the like.

The invention is more fully illustrated in the examples which follow wherein all parts and percentages are by weight unless otherwise specified.

EXAMPLE 1

Using the apparatus shown in FIG. 1, a tubular film is prepared from a liquified polymer supplied by a single screw extruder having a diameter of $\frac{3}{4}$ inch. The polymer is composed of repeating units derived from 85% acrylonitrile and 12% methyl methacrylate grafted onto a preformed poly(vinyl alcohol) which is used in an amount of 3% of the repeating units in the final composition. The polymer has a weight average molecular weight of about 56,000. The extruder feed consists of 70% of polymer, 22% propylene carbonate and 8% water. The melt is extruded into solidification zone 6 which is filled with saturated steam at atmospheric pressure introduced at 11. The extrusion die used has a diameter of $\frac{1}{8}$ inch and a die width of 15 mils. The melt temperature is 135° C. and the feed rate is 5 grams per minute. The nascent film is drawn down at a linear rate of 4 meters per minute. Air, under pressure, is introduced into the center of the tubular film via inlet 3 at sufficient pressure to latitudinally orient the film by expanding the diameter thereof by a factor of four. The air is allowed to bleed out at outlets 5 and 5 A at a rate so as to leave the inside space of the tubular film partially saturated with the propylene carbonate and water, thereby forming a coherent dense skin on the inside of the tubular film and a less dense, porous outer surface. After quenching the resultant membrane with a fine cold water spray at 9, the tube is flattened by passing flattening guides 10 and a pair of pinch rolls 13, serving both as a roll seal and to longitudinally orient the membrane. The membrane is stored in a moisture-proof container while awaiting optional finishing treatments. Samples of this membrane are then washed to remove residual melt assistants and dried in air at room temperature as well as at various elevated temperatures. Microscopic examination of a cross-section of a dried section shows the typical elements of an asymmetric, porous membrane structure, with a substantial proportion of interconnected cells and with the pore texture becoming progressively finer grained in the direction of the dense skin surface. This fine structure is formed as a result of the asymmetric environmental conditions prevailing in the vapor phases during extrusion and stretching. In this case, the dense surface forms on the inside of the tubular film where controlled evaporation of the propylene carbonate and water takes place, whilst on the outside the film is shocked into rapid phase separation. X-ray orientation angles of the dense surface lie between 60° and 70° depending upon drying conditions, lower angles being obtained at lower temperatures. The membrane is useful in reverse osmosis processes.

EXAMPLE 2

The apparatus shown in FIG. 2 is employed, the extruder and die being as in Example 1. Using the same polymer, the extruder feed consists of 72 parts of polymer, 24 parts of propylene carbonate and 4 parts of water. Extrusion temperature is about 138° C. and the feed rate is 5 grams per minute. The nascent film is drawn at the rate of 4 meters per minute. Air under pressure is introduced into the center of the tubular extrudate via inlet 3 at a static pressure sufficient to expand the diameter by a factor of five and thereby latitudinally orient the film. As the hot melt leaves the annular die, small amounts of the water and propylene carbonate evaporate off the outer surface to form a thin and dense skin on the outside of the tube. More surface consolidation takes place when the membrane is quenched by a cold air stream at 9 prior to being flattened at guides 10 and taken away by way of the pinch roll 13. At 24 the flattened membrane is slit into two linear strips which are subjected to a linear stretch of 50% in the machine direction between rolls 19 and 22. Before entering chamber 21 and while undergoing longitudinal orientation by stretching, the membrane strips are given a one-sided blast of steam at atmospheric pressure on that side which was originally the inside of the flattened tube by means of vapor ports 25. This gives rise to the development of an asymmetric pore structure, which is verified as in Example 1 by microscopic observation. The preferential molecular orientation of the dense skin is confirmed by examination with a polarizing microscope. The membrane is useful in gas separation.

EXAMPLE 3

The procedure of Example 1 is again followed in every material detail except that the chamber into which the film is extruded is pressurized and fed with steam at 105° C. The product is similar to that obtained in Example 1 but the throughput rate is increased by at least 30% compared to that of Example 1.

EXAMPLE 4

Example 1 is again repeated in all material details except that chamber 6 into which the film is extruded is filled with isopropanol vapor at the boil instead of steam. A somewhat finer porosity texture is obtained compared to that of the membrane of Example 1. Thus, although the density of the skin is about the same as that of the membrane obtained in Example 1, the pore structure is more uniform and shows fewer large pores.

EXAMPLE 5

Example 1 is repeated in every material detail except that the polymer melt is composed of a commercially available polysulfone, known as UDEL® P-1800 a product of the UNION CARBIDE Co., 18% dimethyl formamide and 6% formamide. The extrusion temperature is 160° C., the take-away speed is 3 meters per minute, and the radial blow expansion ratio is 3.0.

A sample of the resultant membrane is soaked in water for 24 hours followed by several washings with alcohol and air drying. Examination, as described in Example 1, again confirms the presence of an asymmetric pore structure and molecular orientation in the plane of the dense surface, which are as obtained in Example 1. Here again the asymmetric pore structure is brought about as a result of the asymmetric conditions surrounding the film during its formation and stretching, with the conditions inside the tube resembling those frequently used in dry spinning of fibers, whilst the outside conditions are set to bring about what in fiber spinning is referred to as shock coagulation which favors the development of porous structures.

EXAMPLE 6

Example 5 is repeated in every material detail except that the polymer melt contains a blend of polymers. The melt composition is as follows: 70% polysulfone, as in Example 5, 6% poly(vinyl pyrrolidone), GAF K-40®, a product of the GAF Co., 22% dimethyl formamide and 2% water. Microscopic examination of the resulting membrane shows an asymmetric, porous structure with a fine grainy texture.

EXAMPLE 7

A polymer solution is prepared containing 27% of the acrylonitrile copolymer described in Example 1. The solvent is molten caprolactam. The solution is deaerated at 135° C. and extruded at 125° C. with the aid of a metering pump through a circular die as shown in FIG. 1. The film is oriented by the injection of hot (65° C.) pressurized air into the center of the tube thereby expanding its diameter sixfold. At the same time, the film is taken away at six times the linear speed of the solution in the annular extrusion orifice. The chamber surrounding the extruded tubular film contains air maintained at 25° C. or less so that the temperature gradient across the nascent film (inside to outside) is at least 40° C. At point 9 chilled air (0° C.) hits the outside of the tube to quench it before it is flattened. The resultant intermediate membrane is wound up on a chilled roll 14 and readied for further treatment. A sample of the membrane is extracted repeatedly with methanol and air dried. Examination, is as in Example 1, indicating an asymmetric pore structure and considerable biaxial orientation in the plane of the dense outer skin surface. The asymmetric film pore structure in this case is brought about by the temperature gradient that prevails across the nascent film during its stretching and cooling. This makes the solidifying solvent (caprolactam freezes at about 80° C.) migrate towards the colder side, and create solid deposits inside pores upon phase separation and solidification of the system, in an asymmetric pattern.

EXAMPLE 8

Example 7 is repeated in every material detail except that the solvent consists of 81 parts dimethyl sulfoxide, 18 parts urea, and 1 part poly(ethylene glycol) and the polymer concentration is 27%. The extrusion temperature is 110° C. and again a temperature gradient of at least 40° C. is maintained across the inside and outside of the nascent film as in Example 7.

A sample of the resultant intermediate membrane is extracted with butanol, then methanol and is finally air dried. Microscopic examination of the membrane shows an asymmetric pore structure, with the total void volume exceeding 50% of the volume of the membrane base. The molecules in the dense skin surface show a distinct biaxial orientation in the plane of the dense skin.

I claim:

1. A porous, asymmetric polymer membrane having two surfaces one of which is denser than the other, said surfaces being biaxially oriented by stretching each at least about 200%, the variation in longitudinal and latitudinal orientation not varying more than about 25%, said membrane exhibiting a porosity gradient across its thickness with void spaces generally decreasing in at least one of size and number in the direction of the denser surface and the density of said surface being such that the permeability/impermeability characteristics enable chemical separations be achieved, the biaxial orientation of said membrane having been provided thereto before or during development of said porosity gradient.

2. The membrane of claim 1 wherein said polymer is an acrylonitrile copolymer.

3. The membrane of claim 1 wherein said polymer is a polysulfone.

4. The film membrane of claim 1 wherein said file provides useful separations in reverse osmosis.

5. The film membrane of claim 1 wherein said film provides useful separations in gas separation.

* * * * *